United States Patent
Gough et al.

(10) Patent No.: US 7,606,962 B2
(45) Date of Patent: Oct. 20, 2009

(54) DEFERRING PERIPHERAL TRAFFIC WITH SIDEBAND CONTROL

(75) Inventors: Robert Gough, Cornelius, OR (US); Barnes Cooper, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 11/975,841

(22) Filed: Oct. 22, 2007

(65) Prior Publication Data

US 2009/0006704 A1 Jan. 1, 2009

Related U.S. Application Data

(63) Continuation of application No. 11/823,845, filed on Jun. 28, 2007, now Pat. No. 7,546,409.

(51) Int. Cl.
*G06F 13/20* (2006.01)
*G06F 12/14* (2006.01)
(52) U.S. Cl. .................... 710/313; 710/36; 710/206; 713/300
(58) Field of Classification Search ......... 710/305–313, 710/33–48, 260; 713/300
See application file for complete search history.

(56) References Cited

U.S. PATENT DOCUMENTS

| 5,507,002 | A | * | 4/1996 | Heil ............................ 710/8 |
| 5,951,667 | A | * | 9/1999 | Abramson ................. 710/309 |
| 6,105,142 | A | * | 8/2000 | Goff et al. .................. 713/324 |
| 6,237,048 | B1 | * | 5/2001 | Allen et al. ................... 710/8 |
| 6,718,401 | B2 | * | 4/2004 | Nalawadi et al. ............. 710/13 |
| 6,735,660 | B1 | * | 5/2004 | Osten et al. ................ 710/305 |
| 6,907,474 | B2 | * | 6/2005 | Oshins et al. .............. 719/321 |
| 2004/0230934 | A1 | * | 11/2004 | Taylor et al. ................. 716/17 |
| 2005/0160196 | A1 | * | 7/2005 | Dutton et al. ............... 710/10 |
| 2005/0289369 | A1 | * | 12/2005 | Chung et al. .............. 713/300 |
| 2006/0112263 | A1 | * | 5/2006 | Chu et al. ................... 713/1 |
| 2007/0005997 | A1 | * | 1/2007 | Kardach et al. ............ 713/300 |

* cited by examiner

*Primary Examiner*—Christopher B Shin
(74) *Attorney, Agent, or Firm*—Caven & Aghevli LLC

(57) ABSTRACT

In some embodiments, a system comprises a host system comprising an industry standard interface, a peripheral device coupled to the host device via the industry standard interface, and logic in the host system to confirm that the host device supports an enhanced feature, identify at least one pin on the industry standard interface on which the enhanced feature may be implemented, enable support for the enhanced feature on the at least one pin, and route communication traffic associated with the enhanced feature to the at least one pin. Other embodiments may be described.

10 Claims, 7 Drawing Sheets

DEFERRING PERIPHERAL TRAFFIC WITH SIDEBAND CONTROL

RELATED APPLICATIONS

This application is a continuation of U.S. patent application Ser. No. 11/823,845, filed Jun. 28, 2007, now U.S. Pat. No. 7,546,409 entitled DEFERRING PERIPHERAL TRAFFIC WITH SIDEBAND CONTROL.

BACKGROUND

The subject matter described herein relates generally to the field of electronic devices and more particularly to deferring peripheral traffic with sideband control.

The Universal Serial Bus (USB) architecture is defined such that all bus transactions are initiated by a host controller. Therefore, USB devices providing input data need to be polled by the host controller, even to detect if the device needs to signal an interrupt. This periodic polling of devices results in a significant negative impact on the power consumption.

BRIEF DESCRIPTION OF THE DRAWINGS

The detailed description is described with reference to the accompanying figures.

DETAILED DESCRIPTION

Figure 1:
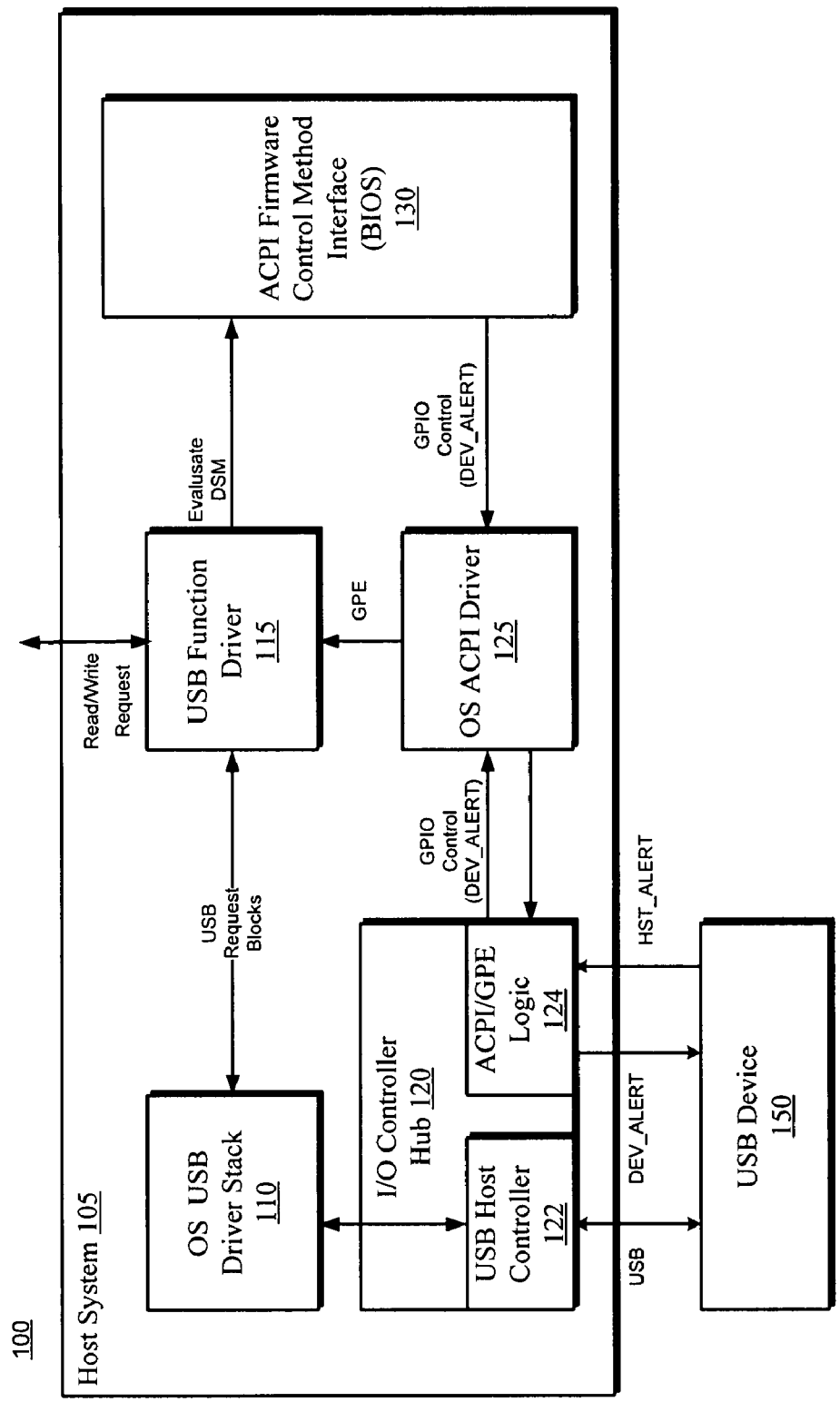
FIG. 1 is a schematic illustration of a USB architecture, in accordance with some embodiments.

Described herein are exemplary systems and methods for deferring bulk data traffic between a computer peripheral device and a computer host system, that permits sideband (i.e., an out-of-band signal path) to manage the traffic deferring protocol. In some embodiments, the systems and method may be implemented as a USB interface that utilizes components of platform firmware (i.e., elements of a system BIOS), host platform hardware (i.e., system board, connectors), host software (i.e., USB driver stack) and a USB peripheral device. Systems and methods described herein permit the USB physical interface to be inactive & idle until a data transfer is required. An exit from an idle state can be signaled from either the host or the USB device, and does not incur the latency associated with the USB Selective Suspend feature. Therefore, the systems and methods described herein provide a low-power USB interface solution with minimal latency required to resume to an operating state.

A USB device comprises one or more bulk endpoints. The USB device is a computer peripheral, capable of sending and receiving data from a host computer system (i.e., a system board). The USB device may have one or more application functions, (i.e., storage, communication, user input/output, etc). In some embodiments, USB components according to embodiments implement two separate hardware signals (HOST ALERT and DEVICE ALERT) to communicate with hardware on the host computer system board. The HOST ALERT signal is driven by the USB device to cause an ACPI GPE ("Advanced Configuration and Power Interface (ACPI) Standard (for example, ACPI Specification, Rev. 3.0, Sep. 2, 2004; Rev. 2.0c, Aug. 25, 2003; Rev. 2.0, Jul. 27, 2000, etc.)" general purpose event). On some host platforms, this USB signal (HOST ALERT) may be routed to a GPIO on an ICH component. The DEVICE ALERT signal is driven by the platform and sampled by the USB device. Both signals are used by their respective sources to signal the other to exit from an idle state. In some embodiments, the ability to use this feature may be disabled by default until the device's function driver enables the feature. Once the driver determines that platform support for this feature is available, it may direct the USB device to present a new configuration, e.g., where the default descriptor table includes an interrupt endpoint descriptor, a device in the new configuration would not include an interrupt endpoint in its descriptor table.

In some embodiments, the operating system (OS) function driver for the USB device manages I/O requests from the OS application interface, and creates or formats requests, or URBs (USB Request Blocks) in response to requests from upper-level driver components, for example the request to read a block of data from a device into a file. The URB may be dispatched to lower-level drivers comprising the OS' USB driver stack. The lowest component of the USB driver stack is the USB host controller driver (i.e., the bus driver). The bus driver translates software requests into hardware packets (i.e., bus cycles) sent on the USB electrical interface. The USB function driver communicates with the OS ACPI driver to evaluate ACPI control methods within the system board's firmware. The control method interface allows the USB function driver to determine whether the deferring feature is supported by the system board, to which GPE the HOST ALERT signal is connected, and to control the assertion of the DEVICE ALERT signal. The USB function driver registers a handler for the HOST ALERT event via the ACPI driver, and configures/enables the USB device to utilize the deferring feature.

The system board/PC host physically connects the signal from the USB component, whether statically attached (e.g. soldered down) or via a connector (e.g. add-in card). The system firmware provides an ACPI control method API (using _DSM, Device Specific Method) which allows the USB function's device driver to interact with the platform without needing platform-specific design knowledge. This API provides three functions: detect platform support, determine which GPE the USB device's HOST ALERT signal is connected to, and control over the DEVICE ALERT signal.

FIG. 1 is a schematic illustration of a USB architecture 100, in accordance with some embodiments. Referring to FIG. 1, in some embodiments a USB device 150 is coupled to a host system 105. For example, host system 105 may be implemented as a personal computer, server, or other electronic device. Host system 105 may comprise an operating system (OS) USB driver stack 110 that provides an interface to an input/output (I/O) controller hub 120. Input-output controller hub 120 may in turn comprise a USB host controller 122 and ACPI/GPE logic 124. Host system 105 may further comprise a USB function driver 115 that is not part of the operating system, and an ACPI driver 125 which may be incorporated into the operating system. Host system 105 further comprises an ACPI firmware control method interface 130, which may be incorporated into the system basic input/output system (BIOS).

In general operation, read/write requests may be received in the host system 105, typically from higher-level applications executing on the host system 105. For example, when host system 105 is implement it on a personal computer read/write requests may originate from one or more applications executing on the personal computer and be passed to the host system 105 for eventual issuance to the USB device 150. Read/write requests received in the function driver 115 may be passed to the USB driver stack 110, which passes the request to the USB Host Controller 122 (residing within input/output controller hub 120), which in turn passes the request to the USB device 150. Input/output requests originating from the USB device are serviced by the driver in the same manner, same direction. However, a driver will keep an open request to the device, waiting for the request to complete. This request may be a bulk read request or an interrupt read request, but either way the request will only be completed when the device provides data to the host controller.

Figure 2:
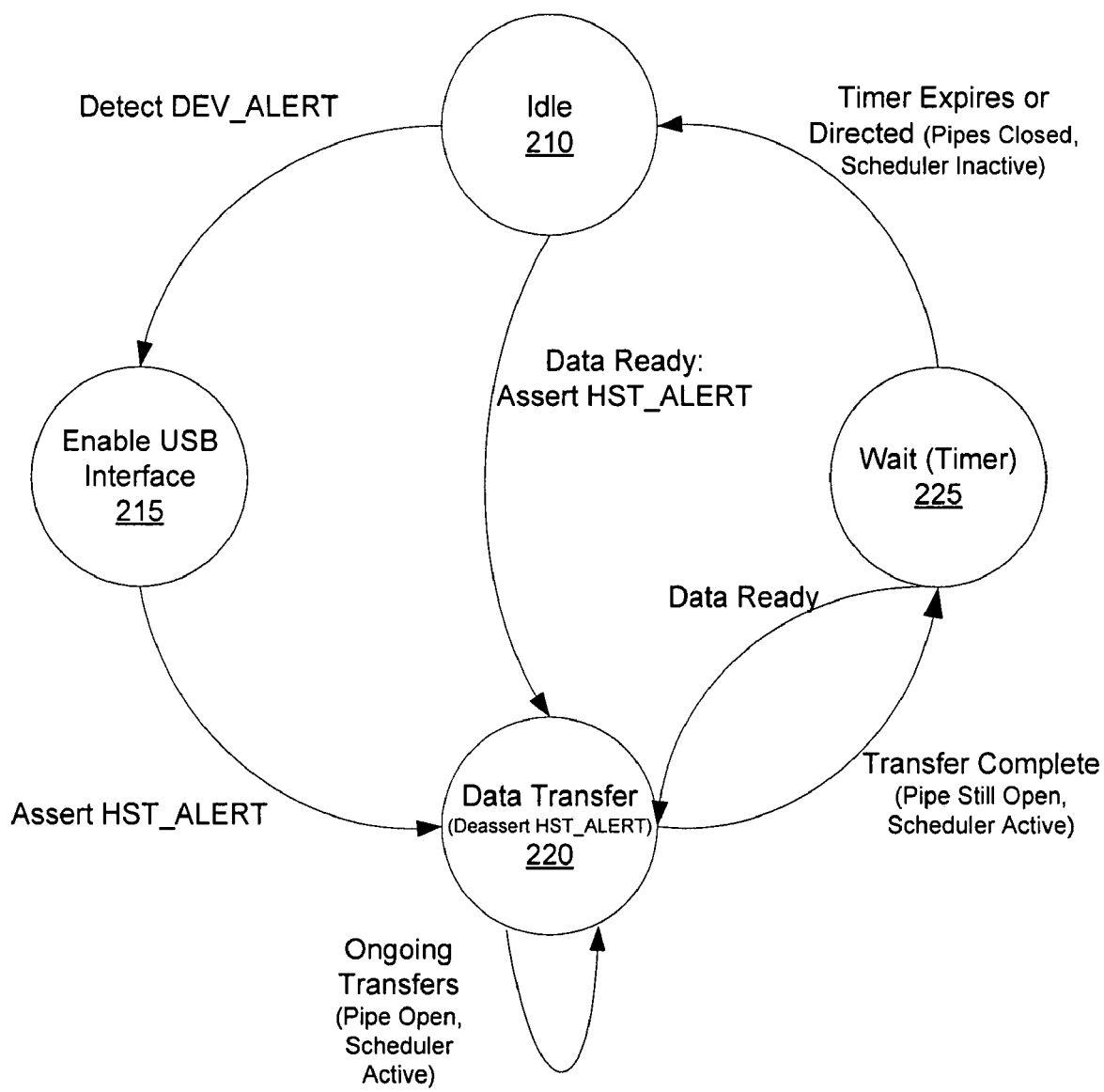
FIG. 2 is a schematic state diagram illustrating operations of a USB device in accordance with some embodiments.
Figure 3:
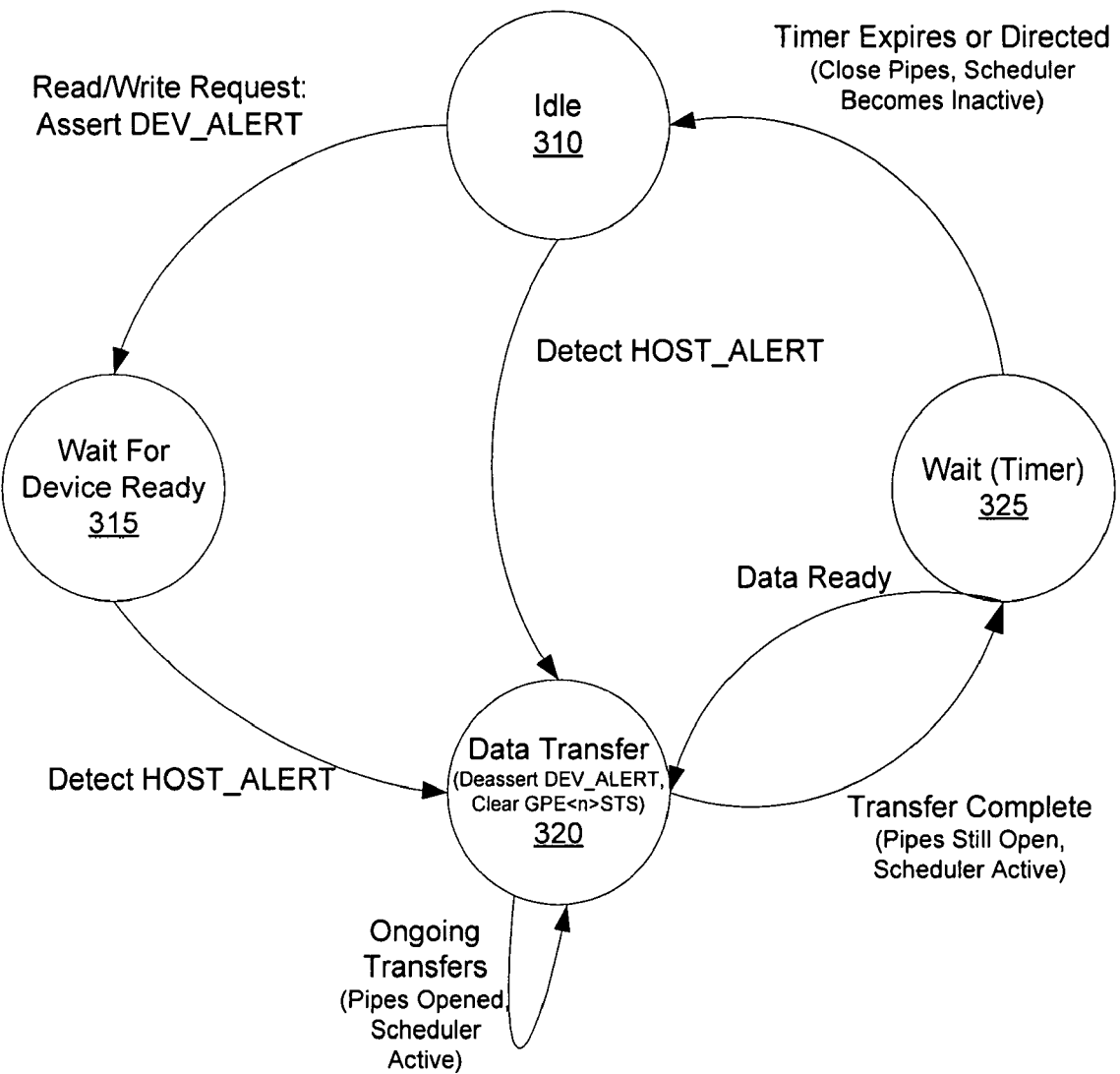
FIG. 3 is a schematic state diagram illustrating operations of a USB device in accordance with some embodiments.

More specific operations of the architecture depicted in FIG. 1 will be explained with reference to FIG. 2 and FIG. 3. FIG. 2 is a schematic state diagram illustrating operations of a USB device in accordance with some embodiments, and FIG. 3 is a schematic state diagram illustrating operations of a USB device in accordance with some embodiments.

Referring first to FIG. 2, in normal operations a USB device may reside in an idle mode 210. Two different events can cause the USB device to change from an idle state. The first event is when the USB device detects a DEVICE ALERT signal, e.g., from the input/output controller hub 120, indicating that the input/output controller hub has data to transfer to the USB device. In response to the DEVICE ALERT signal, the USB device enables the USB interface 215. In the embodiment depicted in FIG. 1, the USB device 150 may enable the interface between the USB device 150 and the USB host controller 122. When the USB interface is enabled, the USB device asserts an HOST ALERT signal across the USB interface, then enters a data-transfer state 220.

The second event is when the USB device originates a data-transfer event from the USB device 152 the host system 105. In this event the USB device 150 may assert an HOST ALERT signal across the USB interface with the input/output controller hub 120. The USB device 150 then enters the data-transfer state 220.

When the USB device 150 is in the data-transfer state 220, the USB device 150 deasserts the HOST ALERT signal. The USB device 150 may remain in a data-transfer state as long as data-transfers are ongoing. The USB data pipe remains open and a scheduler in the host controller remains active.

When data transfer operations are finished, the USB device 150 changes to a wait state 225. In some embodiments, the wait state may be delimited by a timer. In the event that more data becomes available for transfer before expiration of the timer, the USB device 150 changes back to a data-transfer state 220. By contrast, in the event that the timer expires, the USB device changes state back to an idle state 210.

Referring next to FIG. 3, operations of the USB function driver such as, e.g., the USB function driver 115 depicted in FIG. 1 will be described. Referring first to FIG. 3, in normal operations a USB function driver may reside in an idle mode 310. Two different events can cause the USB function driver to change from an idle state. The first event is when the USB function driver originates a data-transfer event from the host system 105 to the USB device 150. In this event the USB function driver 150 may assert a DEVICE ALERT signal across the USB interface with the input/output controller hub 120. The USB function driver 115 then enters a state in which it waits for the USB device 150 to be ready to receive an input/output request. When the USB function driver detects a HOST ALERT signal, the USB function driver enters a data-transfer state.

The second event is when the USB function driver detects a HOST ALERT signal, e.g., USB device 150, indicating that the USB device has data to transfer to the host system 150. In response to the HOST ALERT signal, the USB function driver enters a data-transfer state 320.

When the USB function driver is in the data-transfer state 320, the USB function driver deasserts the DEVICE ALERT signal. The USB function driver may remain in a data-transfer state as long as data-transfers are ongoing. The USB data pipe remains open and a scheduler remains active.

When data transfer operations are finished, the USB function driver changes to a wait state 325. In some embodiments, the wait state may be delimited by a timer. In the event that more data becomes available for transfer for expiration of the timer, the USB function driver changes back to a data-transfer state 320. By contrast, in the event that the timer expires, the USB device changes state back to an idle state 310.

Figure 4:
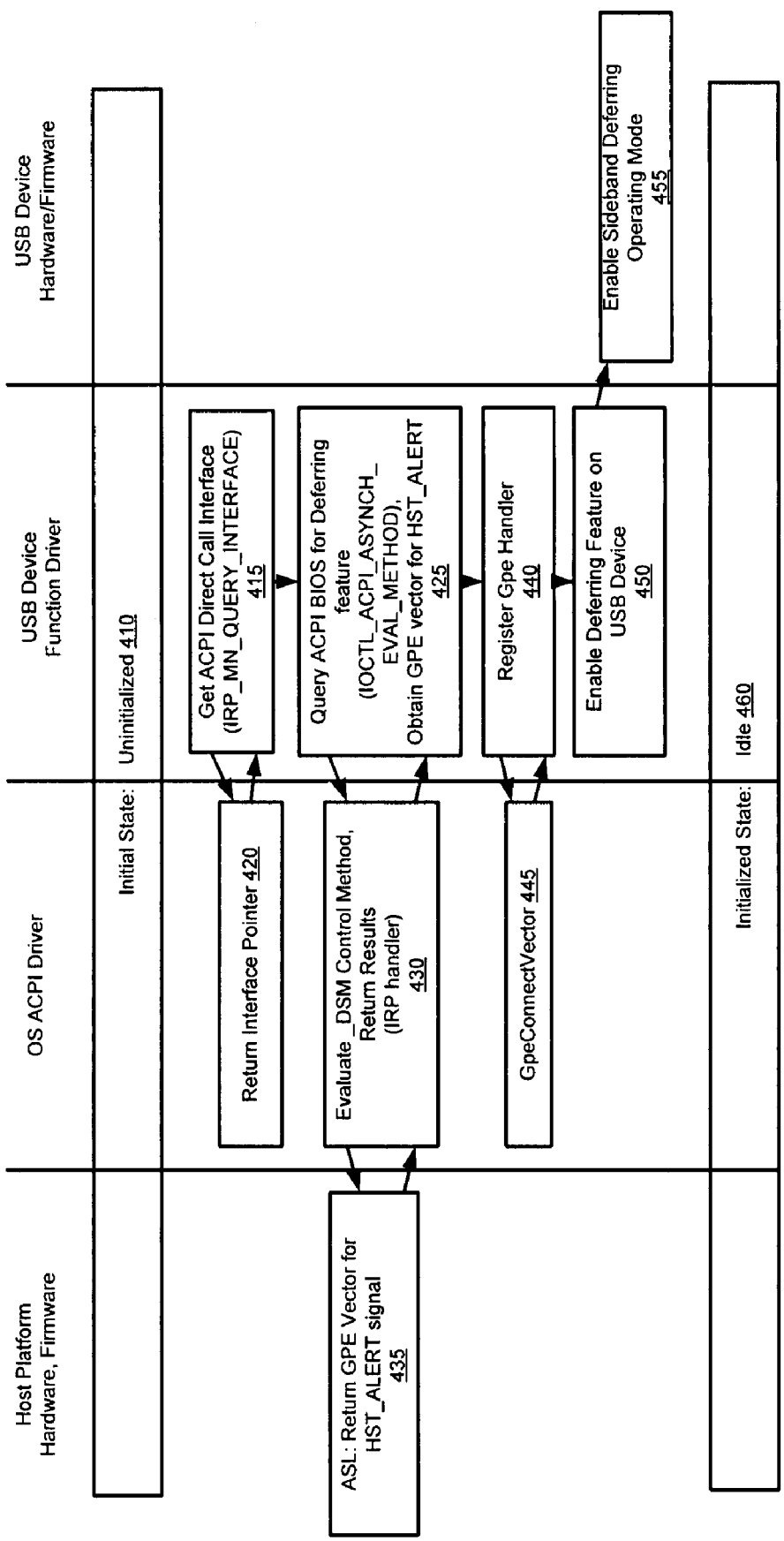
FIG. 4 is a schematic illustration of an initialization sequence processed by a USB driver, in accordance with some embodiments.

FIG. 4 is a schematic illustration of an initialization sequence processed by a USB driver, in accordance with some embodiments. Referring to FIG. 4, the USB driver starts in an uninitialized state 410. At 415 the USB device function driver gets an ACPI direct call interface, e.g., an IRP_MN_QUERY_INTERFACE. At 420 the OS ACPI driver returns the interface pointer to the USB device function driver. At 425 the USB device function driver queries the ACPI BIOS for a deferring feature, e.g., an IOCTL_ACPIP_ASYNCH_EVAL_METHOD and obtains a GPE vector for a HOST ALERT. At 430 the OS ACPI issues an Evaluate_DSM Control Method to the host platform, which at 435, returns the GPE Vector for an HOST ALERT signal. At 430 the OS ACPI driver returns the results, e.g., in an IRP handler. At 440 the USB device function driver registers the GPE handler and at 445 the OS ACPI driver issues a GpeConnectVector. At 450 the USB function driver enables a deferring feature on the USB device and at 455 the USB device hardware (or firmware) enables sideband deferring operating mode. At 460 the function driver is in an initialized but idle state.

Figure 5:
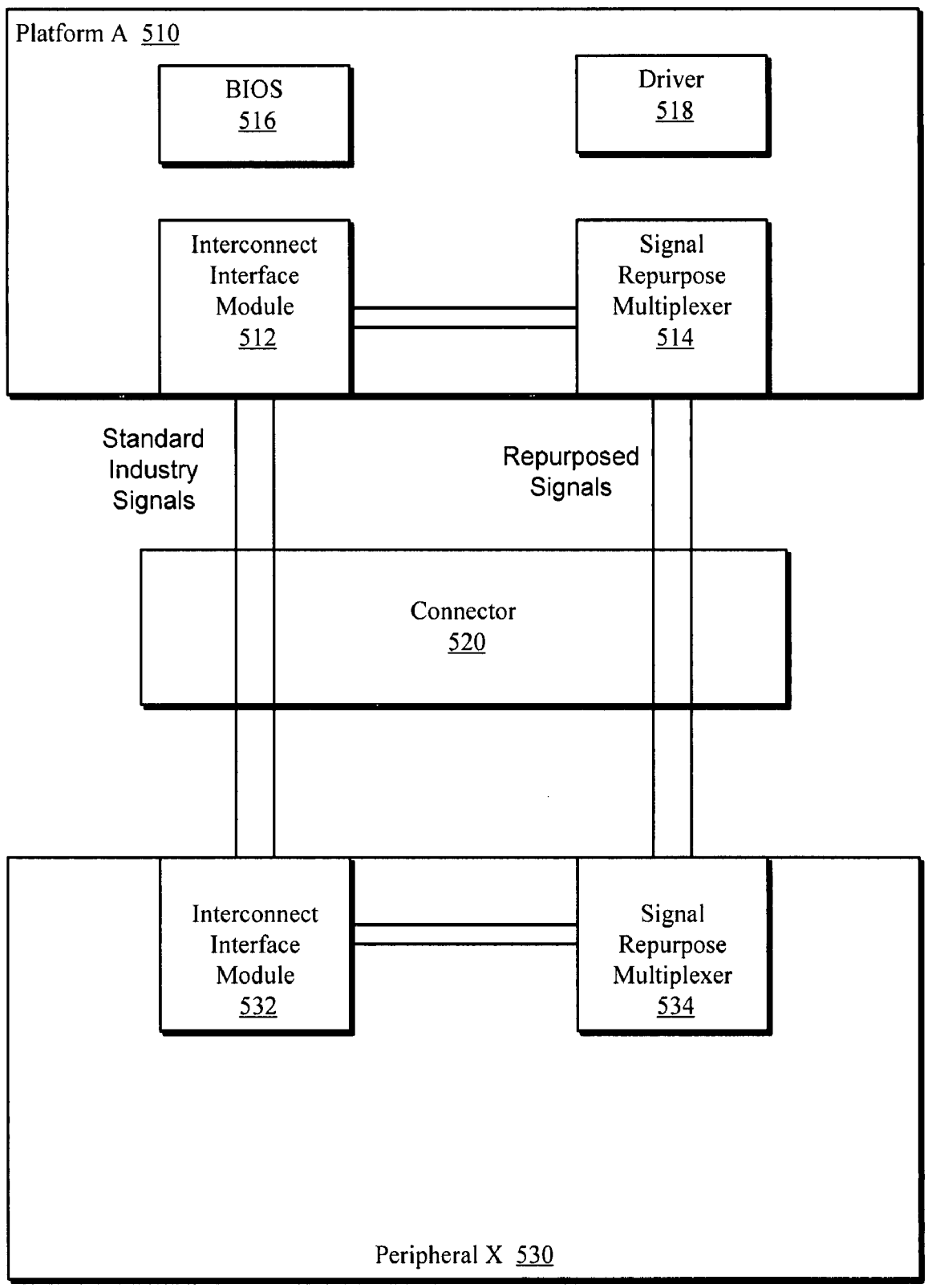
FIG. 5 is a schematic illustration of an arrangement to repurpose signals in an interface, in accordance with some embodiments.

In some embodiments, transmitting at least one of the DEVICE ALERT or the HOST ALERT signals may comprise repurposing a signaling pin on the USB interface between the I/O controller hub 120 and the USB device 150. FIG. 5 is a schematic illustration of an arrangement to repurpose signals in an interface, in accordance with some embodiments.

Referring to FIG. 5, a platform 510 is coupled to a peripheral 530 via a connector 520. In some embodiments the platform 510 may be implemented as a personal computer (PC) platform, including platform firmware (e.g., BIOS), and the peripheral device 530 may be attached via an industry-standard or proprietary connector, or built into the platform 510. The platform commonly includes a device driver, in conjunction with an operating system running on the platform.

In some embodiments, the peripheral device 530 may be attached to the platform 510 via an industry-specified standard connector (e.g., PCI Mini-CEM, ExpressCard connectors, etc.). In other embodiments, the peripheral may be connected via a proprietary interface connector or built into the platform. Combinations of attachments are possible as well—for instance, on a mobile platform, the peripheral device could be built into a dock device, which is subsequently attached to the host platform via a proprietary connector. Attachment may be static or dynamic, allowing for hot-plug (e.g., add & remove) functionality of the peripheral device.

When a peripheral device is installed into a platform via an industry standard interconnect, the interface between the peripheral and the platform is dictated by the interconnect specification. In some cases, a peripheral could achieve a higher level of function (i.e., greater or enhanced functionality) when not constrained by the requirements of the interconnect specification. Hence, in some embodiments the peripheral and platform may repurpose, or change the definition of, a given hardware signal or set of signals defined by the interconnect specification.

The additional feature set should be supported by both peripheral and platform. A mechanism to determine and enable support for this additional functionality needs to be implemented between the platform and the peripheral. In some embodiments, the platform and the peripheral may initiate a negotiation, or handshake, between the host platform and the peripheral device. Once negotiated, the connection(s) on the interconnect that have been repurposed may begin operating in the newly negotiated mode. Prior to negotiation, neither host platform no peripheral device should assume the availability of any functionality or attempt to utilize the affected signal connections, other than in a manner defined by the interconnect specification. The device driver provides normal (non-enhanced) functionality when the device is installed in a platform not supporting the added feature(s). The platform provides normal functionality for all non-enhanced devices installed.

For example, referring to FIG. 5, Peripheral X 530 is installed in Platform A 510 via an industry-standard electromechanical interconnect. Both Peripheral X 530 and Platform A 510 support a specific feature, referred to herein as feature N. Feature N is not specified in the industry standard defining the interconnect. Feature N requires the use of an electrical signal that, likewise, is not specified in the industry standard. Peripheral X 530 can support Feature N utilizing one of pins 2, 3, or 5 on the interconnect. Platform A 510 can support Feature N on one of pins 3, 5, and 6 of the same interconnect.

The device driver for Peripheral X 530 queries the system firmware (BIOS 516) of Platform A regarding support for Feature N. Platform A's firmware responds with possible configurations (pins 3, 5, or 6). A driver for peripheral X 530 passes a request to enable Feature N on pin 3 to Platform X's firmware. The firmware, after enabling the platform to utilize Feature N on pin 3, returns any additional information required by the driver to enable and service Feature N.

Once repurposed, there are no limits to the type of electrical signal that can use this path; analog, digital, logic levels, encoded/packetized data; unidirectional, bidirectional, etc., as well as operate in groups utilizing 2 or more signals.

Additionally, it may be necessary for the platform to switch pins used. In the previous example, the platform may determine (based on some other event) that it wishes to move support of Feature N from pin 3 to pin 5. In this case, the platform firmware may send a notification to the device driver requesting a renegotiation for Feature N. It would also be permissible for Platform A to use this mechanism to disable Feature N, by failing the negotiation.

In a current type of PC platform architecture, notably one supporting the Advanced Configuration and Power Management Interface (ACPI), one possible implementation would use an ACPI Control Method interface and ACPI Notifications to allow communication and negotiation between the Platform firmware and the Peripheral Device's driver.

Figure 6:
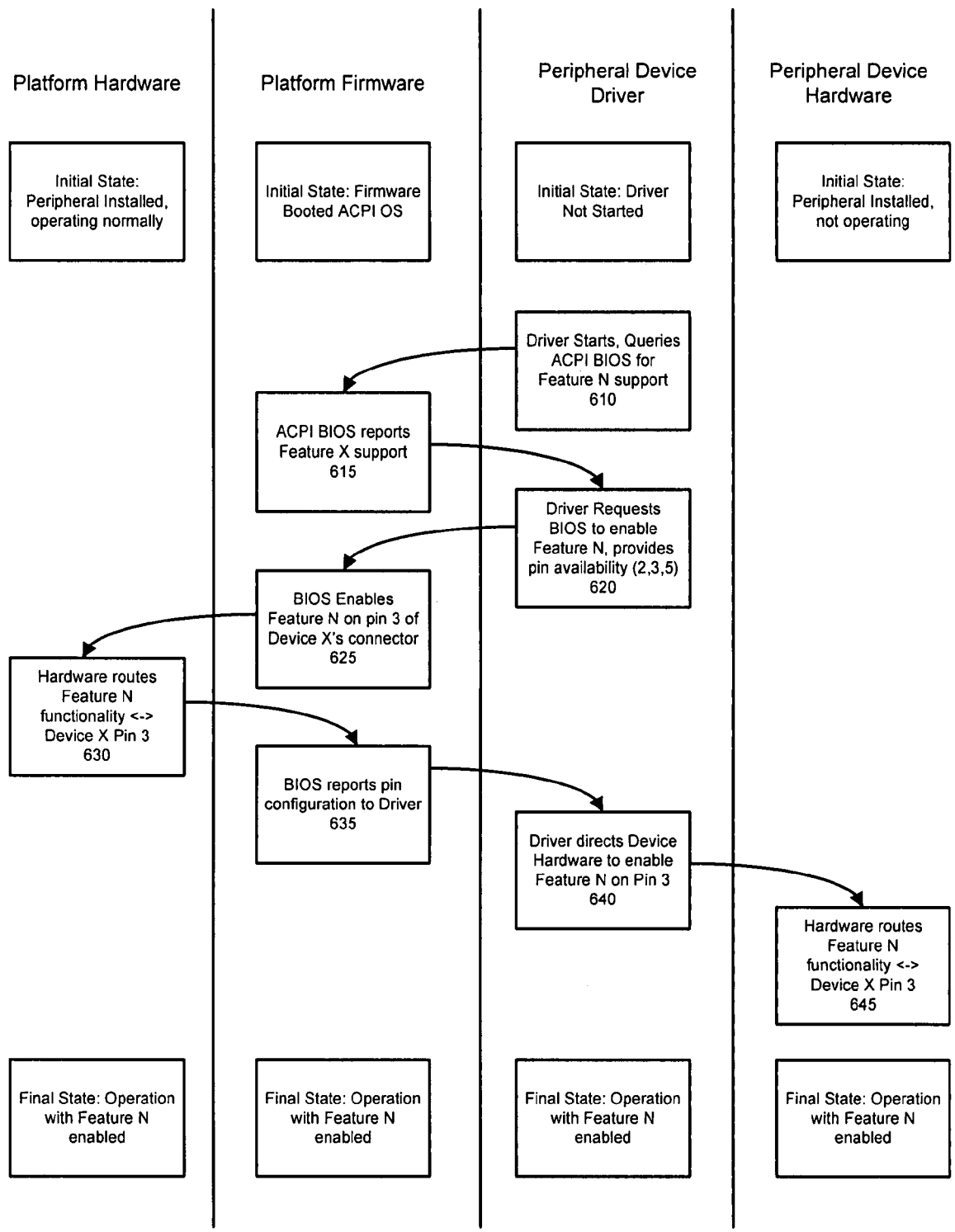
FIG. 6 is a schematic illustration of a method to repurpose signals in an interface, in accordance with some embodiments.

FIG. 6 is a schematic illustration of a method to repurpose signals in an interface, in accordance with some embodiments. Referring to FIG. 6, the method begins with the platform hardware in an initial state of having the peripheral component installed and operating normally. The platform firm begins in an initial state of being booted via an ACPI operating system. The peripheral device driver begins in an initial state of the driver not started. The peripheral device hardware begins in an initial state of the peripheral installed but not operating.

At 610 the peripheral device driver starts and queries the ACPI BIOS for support for Feature N. At 615 the ACPI BIOS reports back to the peripheral device driver on whether the platform firmware supports Feature N. At 620 the driver requests the BIOS to enable feature N and provides an identity of one or more pins available to support Feature N. At 625 the BIOS enables Feature N on pin 3 of the peripheral device's connector. At 630 the platform hardware routes Feature N functionality between the platform and the peripheral device on onto one of the pins identified as available (e.g., Pin 3). At 635 the BIOS reports the pin configuration to the driver, and at 640 the driver directs the device hardware to enable Feature N on the identified pin (i.e., Pin 3 in the example depicted in FIG. 6). At 645 the peripheral device hardware routes functionality associated with Feature N onto the identified pin (i.e., Pin 3 in the example depicted in FIG. 6). Thus, in the final state the all components of the system are in operation with Feature N enabled.

Figure 7:
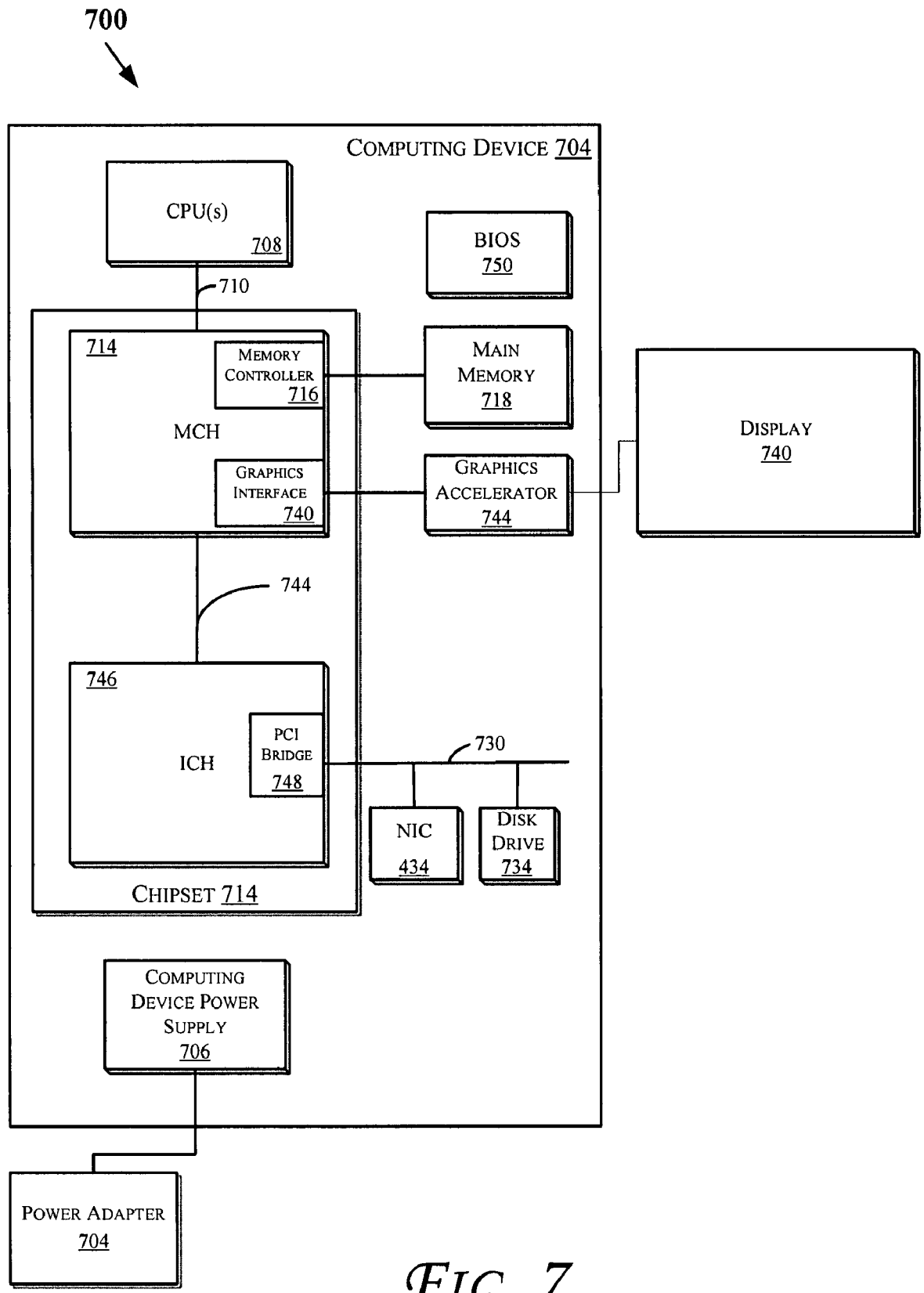
FIG. 7 is a schematic illustration of a computer system, in accordance with some embodiments

FIG. 7 is a schematic illustration of an architecture of a computer system which may include a USB interface 100 in accordance with some embodiments. Computer system 700 includes a computing device 702 and a power adapter 704 (e.g., to supply electrical power to the computing device 702). The computing device 702 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 702 (e.g., through a computing device power supply 706) from one or more of the following sources: one or more battery packs, an alternating current (AC) outlet (e.g., through a transformer and/or adaptor such as a power adapter 704), automotive power supplies, airplane power supplies, and the like. In one embodiment, the power adapter 704 may transform the power supply source output (e.g., the AC outlet voltage of about 110VAC to 240VAC) to a direct current (DC) voltage ranging between about 7VDC to 12.6VDC. Accordingly, the power adapter 704 may be an AC/DC adapter.

The computing device 702 may also include one or more central processing unit(s) (CPUS) 708 coupled to a bus 710. In one embodiment, the CPU 708 may be one or more processors in the Pentium® family of processors including the Pentium® II processor family, Pentium® III processors, Pentium® IV processors, Core and Core2 processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 712 may be coupled to the bus 710. The chipset 712 may include a memory control hub (MCH) 714. The MCH 714 may include a memory controller 716 that is coupled to a main system memory 718. The main system memory 718 stores data and sequences of instructions that are executed by the CPU 708, or any other device included in the system 700. In some embodiments, the main system memory 718 includes random access memory (RAM); however, the main system memory 718 may be implemented using other memory types such as dynamic RAM (DRAM), synchronous DRAM (SDRAM), and the like. Additional devices may also be coupled to the bus 710, such as multiple CPUs and/or multiple system memories.

In some embodiments, main memory 718 may include a one or more flash memory devices. For example, main memory 718 may include either NAND or NOR flash memory devices, which may provide hundreds of megabytes, or even many gigabytes of storage capacity.

The MCH 714 may also include a graphics interface 720 coupled to a graphics accelerator 722. In one embodiment, the graphics interface 720 is coupled to the graphics accelerator 722 via an accelerated graphics port (AGP). In an embodiment, a display (such as a flat panel display) 740 may be coupled to the graphics interface 720 through, for example, a signal converter that translates a digital representation of an image stored in a storage device such as video memory or system memory into display signals that are interpreted and displayed by the display. The display 740 signals produced by the display device may pass through various control devices before being interpreted by and subsequently displayed on the display.

A hub interface 724 couples the MCH 714 to an input/output control hub (ICH) 726. The ICH 726 provides an interface to input/output (I/O) devices coupled to the computer system 700. The ICH 726 may be coupled to a peripheral component interconnect (PCI) bus. Hence, the ICH 726 includes a PCI bridge 728 that provides an interface to a PCI bus 730. The PCI bridge 728 provides a data path between the CPU 708 and peripheral devices. Additionally, other types of I/O interconnect topologies may be utilized such as the PCI Express™ architecture, available through Intel® Corporation of Santa Clara, Calif.

The PCI bus 730 may be coupled to a network interface card (NIC) 732 and one or more disk drive(s) 734. Other devices may be coupled to the PCI bus 730. In addition, the CPU 708 and the MCH 714 may be combined to form a single chip. Furthermore, the graphics accelerator 722 may be included within the MCH 714 in other embodiments.

Additionally, other peripherals coupled to the ICH 726 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like.

System 700 may further include a basic input/output system (BIOS) 750 to manage, among other things, the boot-up operations of computing system 700. BIOS 750 may be embodied as logic instructions encoded on a memory module such as, e.g., a flash memory module.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method to repurpose electrical connectors on an industry standard interface between a host device and a peripheral device, comprising:
   confirming that the host device supports an enhanced feature;
   identifying at least one pin on the industry standard interface on which the enhanced feature may be implemented;
   enabling support for the enhanced feature on the at least one pin; and
   routing communication traffic associated with the enhanced feature to the at least one pin.

2. The method of claim 1, wherein confirming that the host device supports an enhanced feature comprises querying an ACPI BIOS structure in the host device.

3. The method of claim 1, wherein a peripheral device driver:
   identifies at least one pin on the industry standard interface on which the enhanced feature may be implemented; and
   directs hardware on the peripheral device to enable the enhanced feature on the at least one pin.

4. The method of claim 1, wherein the host device is connected to the peripheral device via a USB interface, and further comprising:
   placing the USB interface into an idle mode in which interface polling activity is ceased after a predetermined period of inactivity;
   asserting, in the USB host system, a DEVICE ALERT signal on the USB interface when the USB host system has data to transfer to the USB device; and
   asserting, in the USB device, a HOST ALERT signal on the USB interface when the USB device has data to transfer to the USB host system.

5. The method of claim 4, wherein the USB host system repurposes a pin on the USB interface for the DEVICE ALERT signal.

6. The method of claim 4, wherein the USB host system repurposes a pin on the USB interface for the HOST ALERT signal.

7. A system, comprising:
   a host system comprising an industry standard interface;
   a peripheral device coupled to the host device via the industry standard interface; and
   logic in the host system to:
      confirm that the host device supports an enhanced feature;
      identify at least one pin on the industry standard interface on which the enhanced feature may be implemented;
      enable support for the enhanced feature on the at least one pin; and
      route communication traffic associated with the enhanced feature to the at least one pin.

8. The system of claim 7, the logic in the host system confirms that the host device supports an enhanced feature comprises querying an ACPI BIOS structure in the host device.

9. The system of claim 7, wherein the peripheral device driver:
   identifies at least one pin on the industry standard interface on which the enhanced feature may be implemented; and
   directs hardware on the peripheral device to enable the enhanced feature on the at least one pin.

10. The system of claim 7, wherein the industry standard interface comprises a universal serial bus (USB) interface.

* * * * *